United States Patent
Goshima et al.

[11] Patent Number: 6,062,605
[45] Date of Patent: May 16, 2000

[54] WELDLESS JOINT

[75] Inventors: Kenichi Goshima; Hiroshi Itafuji; Shigenobu Nishida, all of Kasugai, Japan

[73] Assignee: CKD Corporation, Japan

[21] Appl. No.: 09/166,278

[22] Filed: Oct. 5, 1998

[30] Foreign Application Priority Data

Feb. 16, 1998 [JP] Japan .................................. 10-032590

[51] Int. Cl.⁷ ............................ F16L 55/00; F16L 27/00; F16L 17/00; F16L 21/05
[52] U.S. Cl. .......................... 285/13; 285/276; 285/336; 285/281; 277/603; 277/626
[58] Field of Search .................................... 277/603, 616, 277/619–622, 626; 285/13, 14, 272, 276, 280, 281, 336, 348, 353, 354, 369

[56] References Cited

U.S. PATENT DOCUMENTS

| | | | |
|---|---|---|---|
| 3,618,987 | 11/1971 | Carbone | 285/353 X |
| 4,886,304 | 12/1989 | Kunsman | 285/348 X |
| 5,074,599 | 12/1991 | Wirbel et al. | 285/354 X |
| 5,094,480 | 3/1992 | Boileau | 285/14 |
| 5,118,141 | 6/1992 | Miyashita | 285/336 |
| 5,605,358 | 2/1997 | Mohlenkamp | 285/353 X |

FOREIGN PATENT DOCUMENTS

| | | | |
|---|---|---|---|
| 465841 | 4/1914 | France | 285/276 |
| 1373072 | 8/1964 | France | 285/14 |
| 510304 | 5/1957 | Italy | 285/348 |

*Primary Examiner*—James R. Brittain
*Assistant Examiner*—Gary Grafel
*Attorney, Agent, or Firm*—Finnegan, Henderson, Farabow, Garrett & Dunner, L.L.P.

[57] ABSTRACT

In a weldless joint 13, screwing a fastening member 13 into a joint body allows two pipes to move closer to each other in an axial direction without rotating. The two pipes can be thus connected without welded. Packings and disposed in the joint body prevent the leakage of gas through the contact surfaces of the pipes and, further, the leakage of gas from the inside of the joint body to the outside thereof. Accordingly, no packing or sealing element is needed on the periphery of the fastening member.

10 Claims, 10 Drawing Sheets

PRIOR ART

FIG. 10  PRIOR ART

WELDLESS JOINT

BACKGROUND OF THE INVENTION

1. Field of the Invention

The present invention relates to a weldless joint for use in a process gas pipe system in a semiconductor manufacturing line.

2. Description of Related Art

In conventional semiconductor manufacturing lines, a process gas which possesses strong toxicity, e.g., silane gas, is used. Each of various devices connected to the semiconductor manufacturing line is generally retained and replaced so that the inside of the device is not exposed to air in order to prevent the deterioration of performance.

For example, a purge joint 100 shown in FIG. 9 has been provided in the semiconductor manufacturing line to substitute inert gas for the strong toxic process gas, thereby preventing the presence of the process gas at the time of replacement of the devices. Also, the devices are replaced so that the inside thereof is not exposed to air.

Figure 9A:
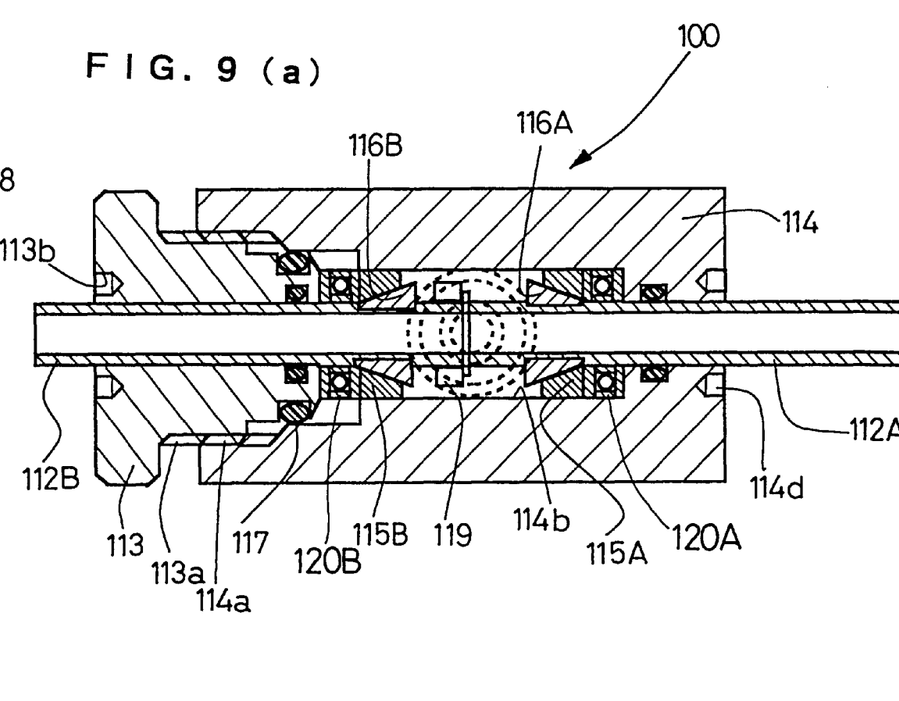
FIG. 9(a) is a sectional view of a conventional weldless joint.
Figure 9B:
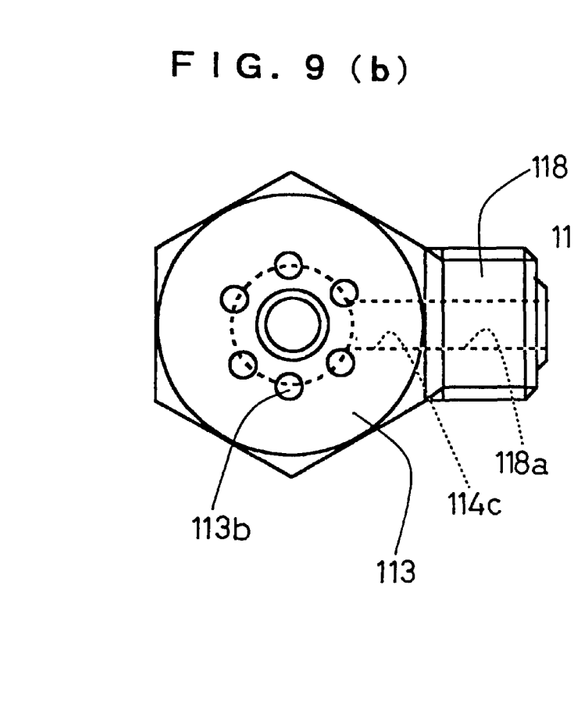
FIG. 9(b) is a side view of the conventional weldless joint of FIG. 9(a)
Figure 10:
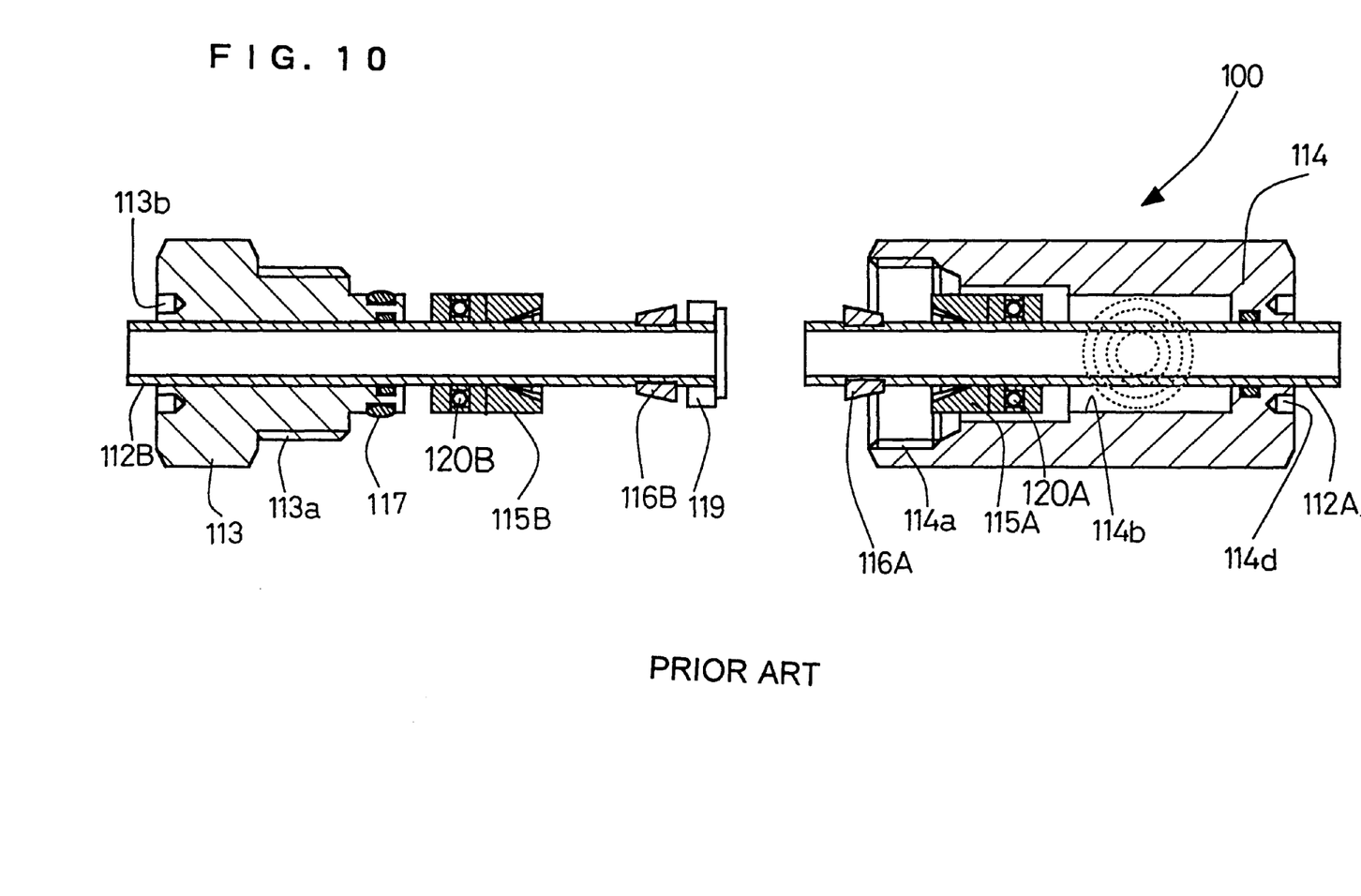
FIG. 10 is an exploded sectional view of the conventional weldless joint of FIG. 9(a).

Such a purge joint 100 is explained with reference to FIGS. 9 and 10. FIG. 9(a) is a sectional exploded view of the purge joint 100 and FIG. 9(b) is a left side view of FIG. 9(a). FIG. 10 is a sectional exploded view of the purge joint 100.

The purge joint 100 is a weldless joint for connecting two pipes 112A and 112B as shown in FIG. 9. This purge joint 100 has a joint body 114 with six spanner holes 114d on the right end plane in the drawing. The pipe 112A is inserted into a cavity 114B of the joint body 114 through an opening formed in the right end plane of the body 114.

The pipe 112A is provided on its periphery with an annular groove in which an inner ferrule 116A having a wedge-shaped cross section is fitted. The inner ferrule 116A is provided with a plurality of cut-out grooves (not shown) formed in an axis direction so that it can be expanded to be slid onto the pipe 112A and mounted in place. These attached inner ferrule 116A can be moved integrally with the pipe 112A in an axial direction thereof.

An outer ferrule 115A is disposed on the right side of the inner ferrule 116A so that they are engaged with each other. A thrust bearing 120A is mounted on the pipe 112A on the right side of the outer ferrule 115A, whereby the pipe 112A does not rotate even if the joint body 114 is rotated.

The cavity 114b opens on the left end of the joint body 114 and is provided with a stepped large diameter portion having a female screw 114a. A nut member 113 having a male screw 113a formed on a periphery thereof is screwed into the female screw 114a. The nut member 113 is provided with a center hole in which the pipe 112B is inserted toward the cavity 114b. The nut member 113 also has on the left end thereof six spanner holes 113b.

Similarly, the pipe 112B is provided on its periphery with a pipe groove in which an inner ferrule 116B having a wedge-shaped cross section is fitted. The inner ferrule 116B is provided with a plurality of cut-out grooves (not shown) formed in an axis direction so that it can be expanded to be slid onto the pipe and attached in place. The so attached inner ferrule 116B can be moved integrally with the pipe 112B in an axial direction of the pipe.

An outer ferrule 115B is disposed on the right side of the inner ferrule 116B so that they are engaged with each other. A thrust bearing 120B is mounted on the pipe 112B on the right side of the outer ferrule 115B, whereby the pipe 112B does not rotate even if the joint body 114 is rotated.

The left end plane of the outer ferrule 115B is in contact with the right end plane of the nut member 113. A gasket 119 provided with a center hole is attached to the tip end of the pipe 112B. The gasket 119 is made of soft metal and is sandwiched under pressure between the pipes 112A and 112B, thereby serving as a seal which prevents gas leakage from the contact surfaces of the pipes 112A and 112B.

An outer port 114C is formed in the joint body 114 at a position corresponding to the connecting area of the pipes 112A and 112B and the clearance forming area between the pipes. This outer port 114C communicates with a port 118a of an outer joint 118 having a male screw on the periphery thereof.

The process for connecting the pipes 112A and 112B using the purge joint 100 shown in FIG. 9 is explained. The pipes 112A and 112B in a separated state are shown in FIG. 10 and will be connected in a manner that the nut member 113 is screwed into the joint body 114 as the pipes 112A and 112B make contact with each other through the gasket 119. It is to be noted that the screwing of the nut member 113 into the joint body 114 is made with a spanner through the spanner holes 113b and 114d.

As the nut member 113 is screwed into the joint body 114, the outer ferrule 115B is pushed rightward in the drawing, which pushes the inner ferrule 116B rightward, and further the pipe 112B rightward. Accordingly, the pipe 112B is made to press the pipe 112A through the gasket 119. At this time, the thrust bearing 120B allows the pipe 112B to move without rotating even when the nut member 113 being rotated presses the outer ferrule 115B.

On the other hand, the pipe 112A presses the inner ferrule 116A rightward via the pipe groove. The pressing force of the inner ferrule 116A is exerted on the joint body 114 through the outer ferrule 115A. As mentioned above, the thrust bearing 120A allows the pipe 112A to move without rotating even when the outer ferrule 115A presses upon the joint body 114.

Accordingly, when the nut member 113 is screwed into the joint body 114, the pipes 112A and 112B compress the gasket 119 therebetween whereby to seal the contact surfaces of the pipes. At this time, the area where the pipes 112A and 112B are in contact, namely, the location of the gasket 119 is always in a predetermined position. The opening 114C is formed corresponding to this position.

If the nut member 113 is loosened on the joint body 114, a clearance between the pipes 112A and 112B is produced in an area corresponding to the opening 114C. In this state, evacuation and purge processes are repeated to substitute inert gas for process gas in the pipes 112A and 112B. Thus, the purge joint 100 utilizes the outer joint 118 as a purge port.

Subsequently, if the nut member 113 is screwed into the joint body 114 to connect the pipes 112A and 112B, no air enters in the pipes 112A and 112B. The devices connected to the pipes 112A and 112B can be replaced with different devices without the inside of the devices being exposed to air.

However, the purge joint 100 is provided with an O-ring 117, which is fitted to the nut member 113, to prevent air from entering in the cavity 114b. Because the O-ring 117 is disposed between the nut member 113 and the joint body 114 high torque is required for the screwing of the nut member 113 into the joint body 114.

SUMMARY OF THE INVENTION

The present invention has been made in view of the above circumstances and has an object to overcome the above problems and to provide a weldless joint capable of reducing fastening torque to connect pipes, thereby to improve workability in the substitution of inert gas for process gas and the replacement of various devices connected to the pipes.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a weldless joint including two pipes to be connected by the weldless joint, the pipes being moved without rotation inside a joint body, a fastening member which is screwed into the joint body to connect the two pipes, and a packing for preventing leakage of gas through contact surfaces of the pipes and also leakage of gas from the inside of the joint body to the outside thereof.

In the weldless joint according to the present invention, two pipes to be connected by the weldless joint can be moved in an axial direction without rotating. When the fastening member is screwed into the joint body, the two pipes are caused to move closer to each other and come into contact under pressure with each other. Thus, the two pipes can be connected without being welded.

The packing disposed in the joint body can prevent the leakage of gas from the contact surfaces of the two pipes when connected. The packing can also prevent the leakage of gas from the inside of the joint body to the outside thereof when the fastening member is loosened, so that no sealing or packing member needs to be provided on the periphery of the fastening member.

Since there is no need to provide any sealing member on the fastening member of the weldless joint according to the invention, no sealing member exists between the fastening member and the joint body and, the fastening torque of the fastening member can be reduced.

Also, no mounting space for a sealing member is needed, so that the weldless joint can be reduced in size.

According to the present invention, it is preferable that the packing is provided integrally with an inner member disposed in the joint body. This makes it possible to facilitate the assembly and disassembly of the weldless joint and to prevent the loss of the packing.

It is preferable that the packing integral with the inner member is separated on disconnection of the two pipes. Accordingly, the packing can ensure the sealing between the contact surfaces of the two pipes in pressure-contact with each other.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of one preferred embodiment of a weldless joint embodying the present invention will now be given referring to the accompanying drawings.

Figure 1:
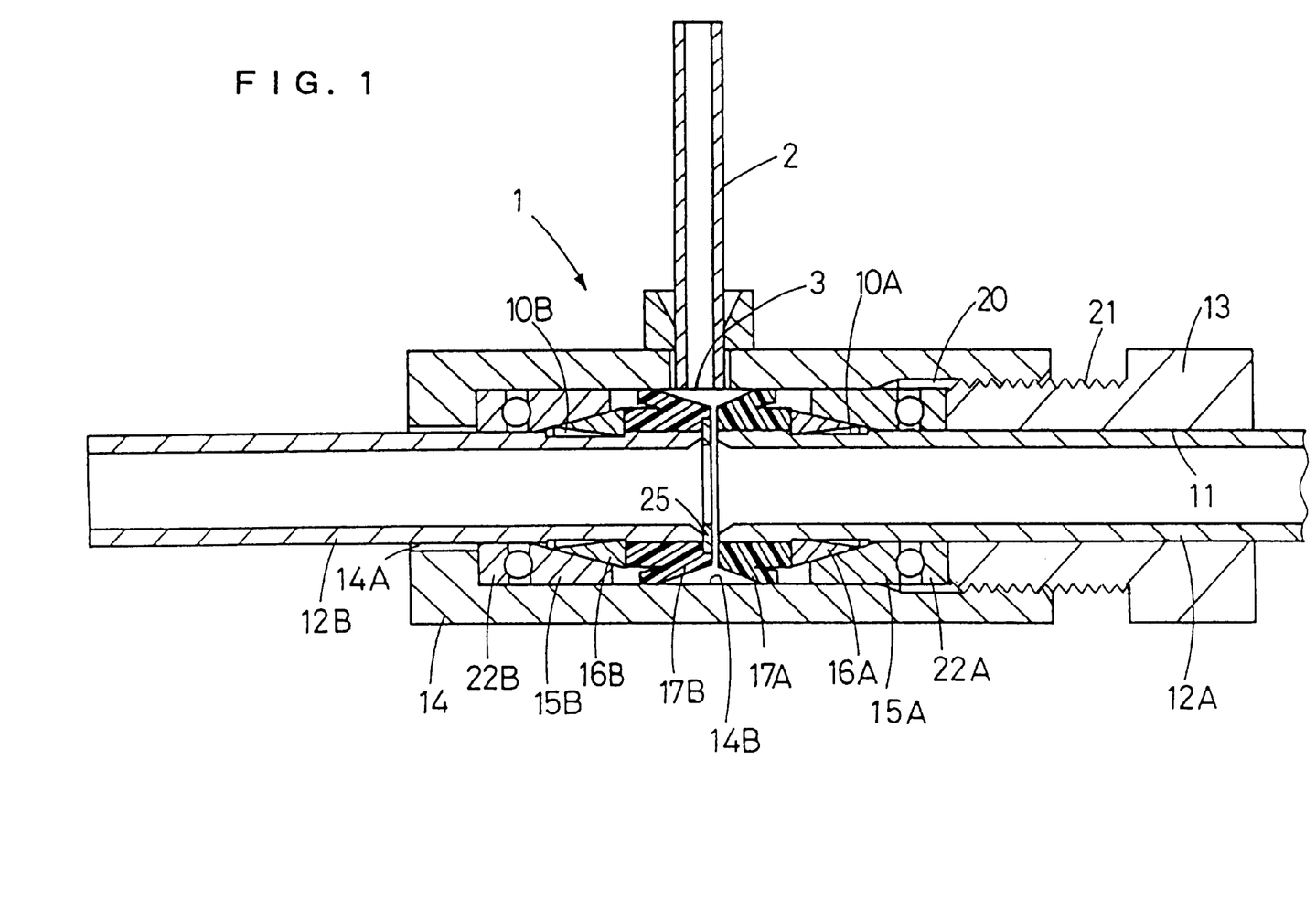
FIG. 1 is a sectional view of a weldless joint in an embodiment according to the invention, showing two disconnected pipes prior to be connected by the weldless joint.
Figure 2:
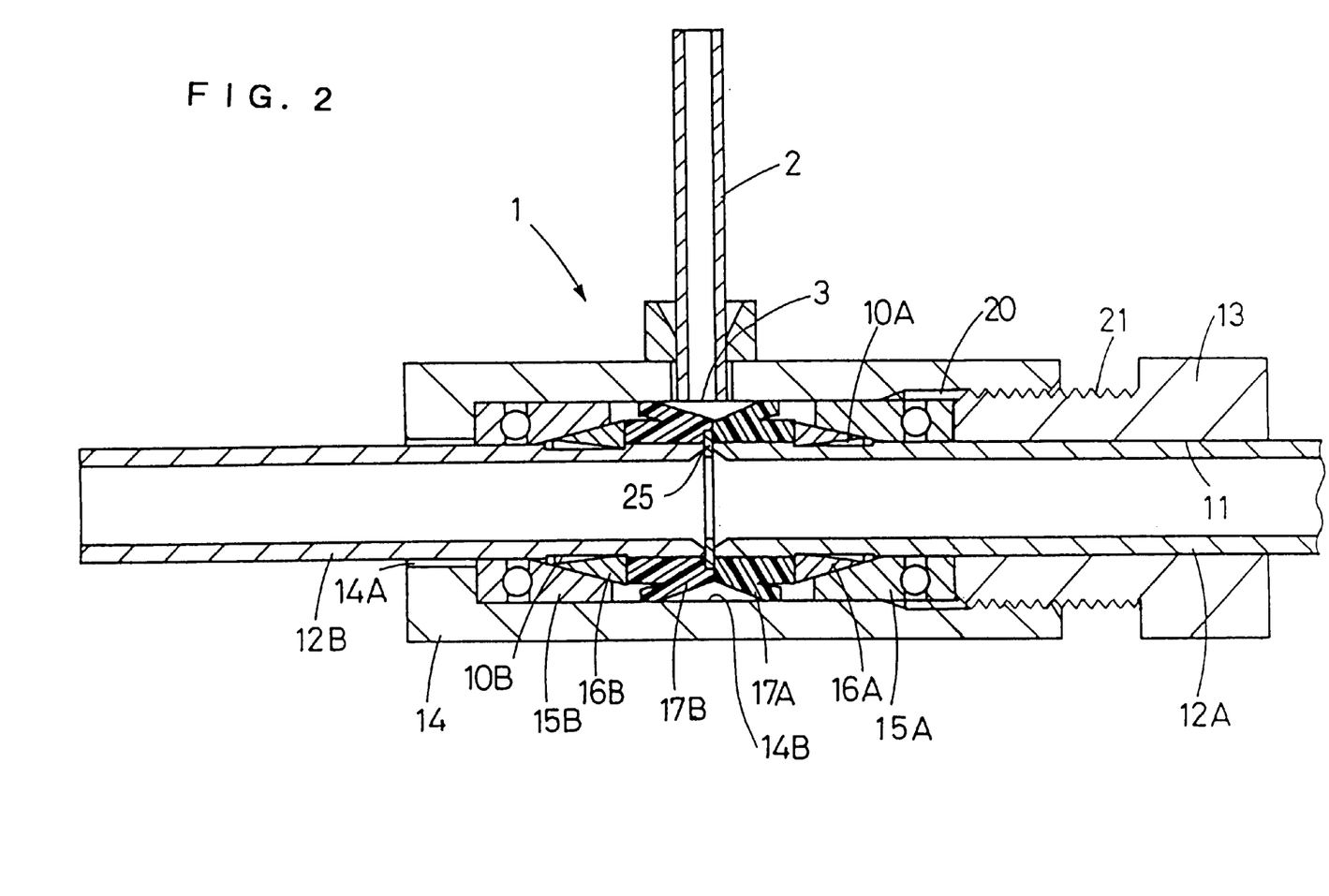
FIG. 2 is a sectional view of the weldless joint, showing the two pipes connected by a pressure contact.

FIGS. 1 and 2 are sectional views of the weldless joint of the embodiment; FIG. 1 shows a state where two pipes to be connected by the joint 1 are separated and FIG. 2 shows a state where the pipes are in contact under pressure with each other.

The weldless joint 1 is provided with a joint body 14 having a cavity 14B and a nut-like fastening member 13 which is screwed into the joint body 14. This joint body 14 is formed with an opening 14A in the center of the left end plane. A pipe 12B is inserted through the opening 14A into the cavity 14B of the body 14. The pipe 12B is formed on its periphery with an annular groove 10B in which an inner ferrule 16B having a wedge-shaped section is fitted. This inner ferrule 16B is integral with a packing 17B disposed on the tip end side of the pipe 12B.

Figure 4:
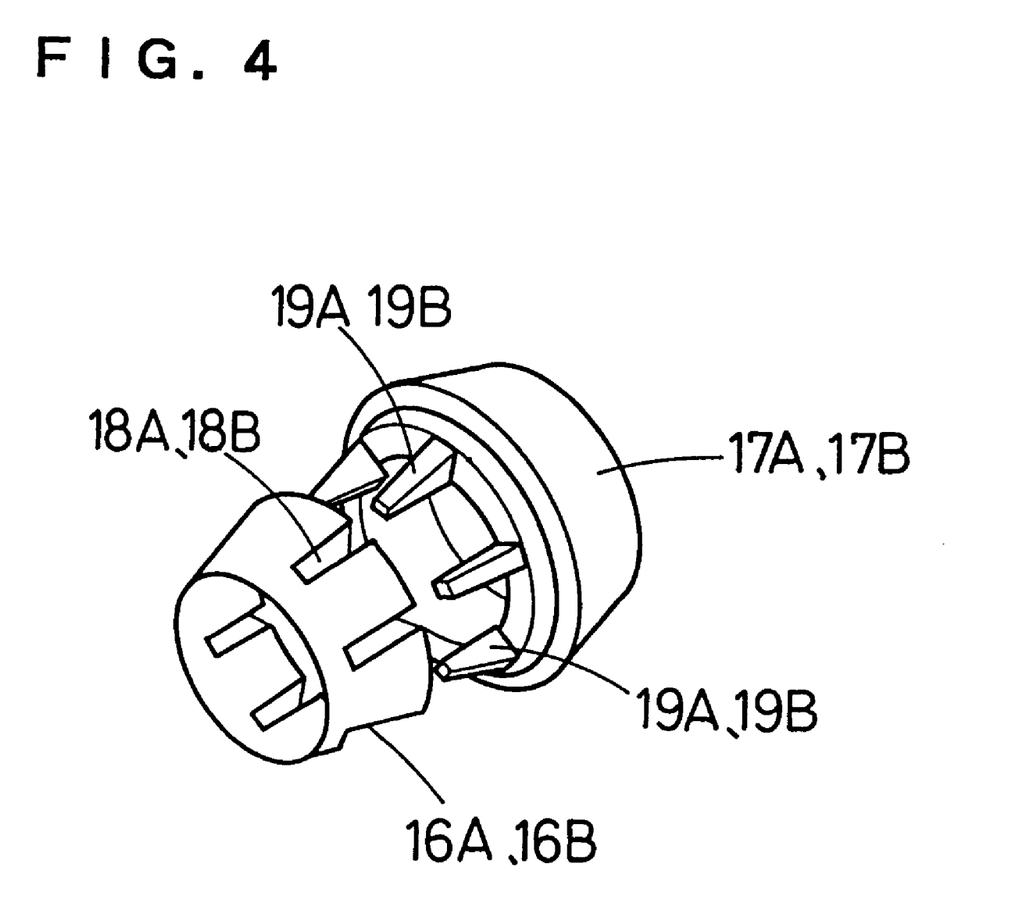
FIG. 4 is a perspective exploded view of an inner ferrule and a packing.

FIG. 4 is a perspective exploded view of the inner ferrule 16B and the packing 17B. As shown in FIG. 4, the inner ferrule 16B is formed with a plurality of cut-out grooves 18B at predetermined intervals. The packing 17B is formed of an elastic body having a substantial V-shaped cross-section. This packing 17B is also provided with a plurality of protrusions 19B on an end plane thereof facing the inner ferrule 16B in correspondence with the grooves 18B.

Figure 5:
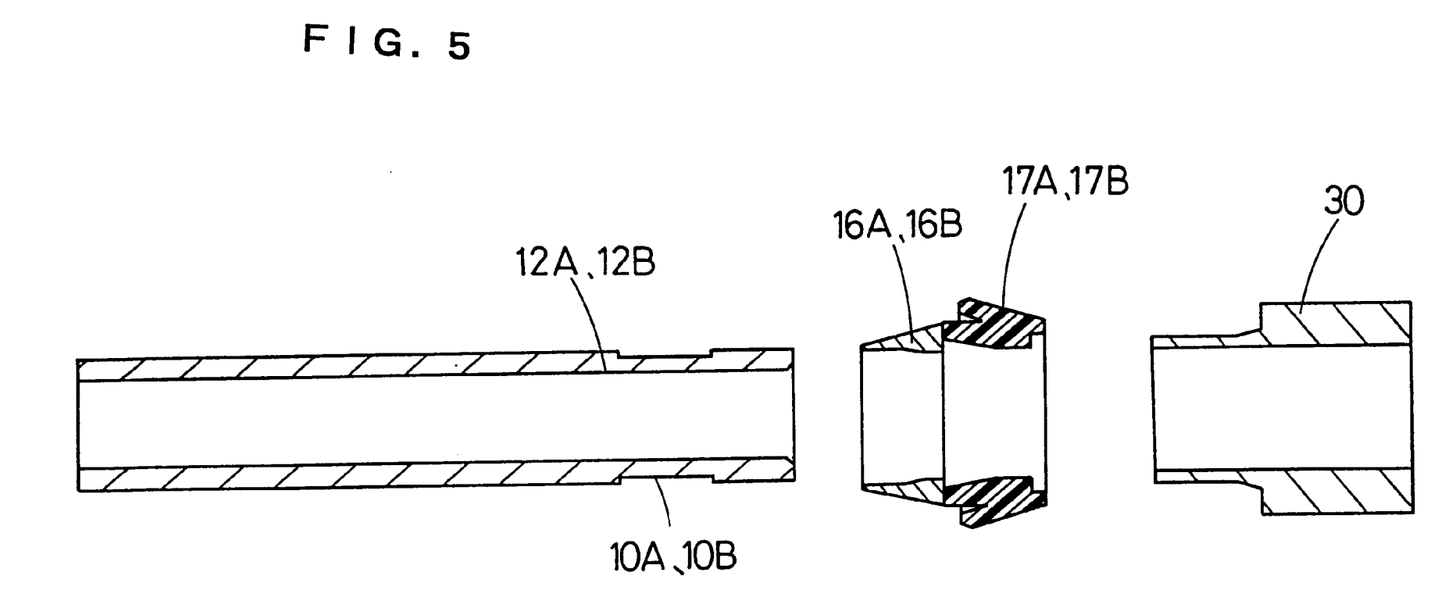
FIG. 5 is an exploded sectional view of the inner ferrule, packing, pipe and an assembly jig.
Figure 6:
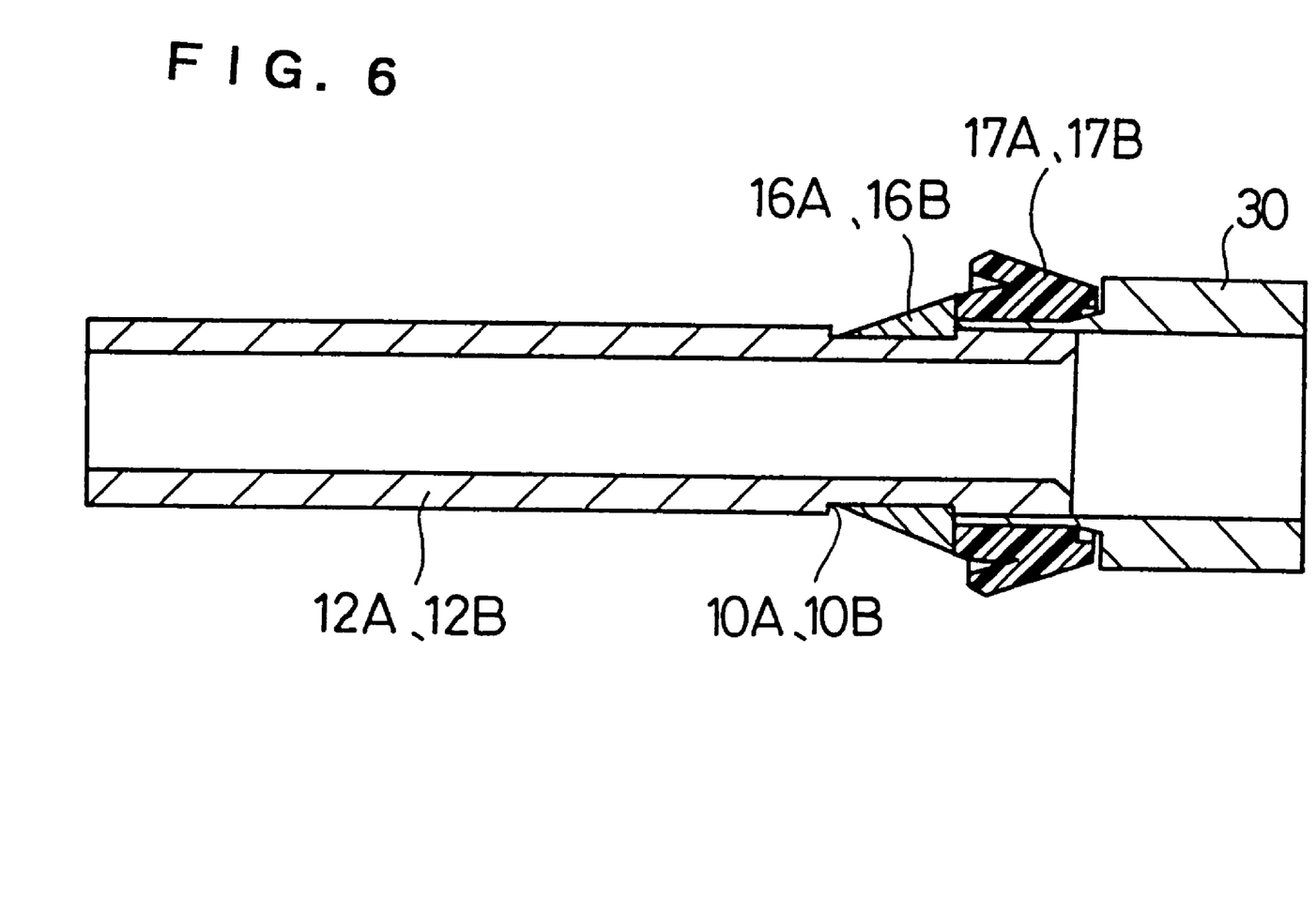
FIG. 6 is a sectional view of the inner ferrule and the packing mounted on the pipe by the jig.

The inner ferrule 16B and the packing 17B are slid onto the pipe 12B from its tip end by means of a jig 30 (see FIGS. 5 and 6). The inner ferrule 16B is widened through the aid of the grooves 18 until the inner ferrule 16B is fitted in the annular groove 10B of the pipe 12B. Thus, the inner ferrule 16B attached in place does not rotate with respect to the pipe 12B and can be moved along with the pipe 12B in an axial direction.

Figure 3:
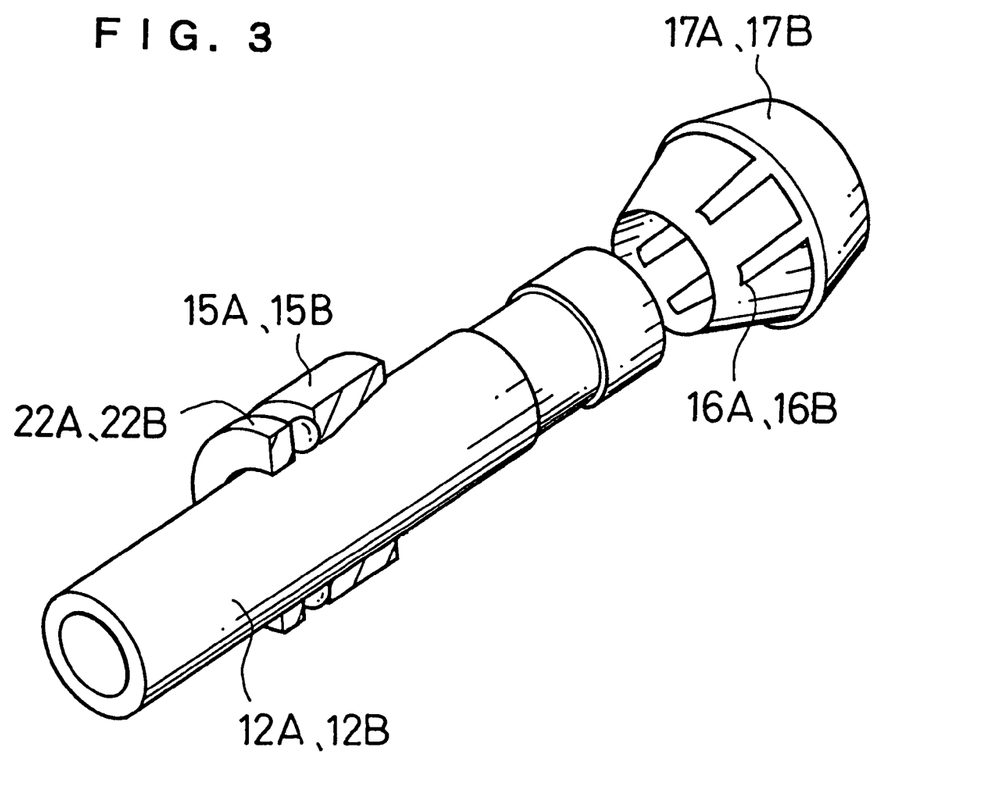
FIG. 3 is a perspective exploded view of an outer ferrule, inner ferrule, packing, and pipe.

Returning to FIG. 1, an outer ferrule 15B is disposed on the left side of the inner ferrule 16B in the cavity 14B so that the inner ferrule 16B is wedged into the outer ferrule 15B. A thrust bearing 22B is disposed on the left side of the outer ferrule 15B, preventing the rotation of the pipe 12B even when the joint body 14 rotates. FIG. 3 is a perspective view of the pipe 12B on which the outer ferrule 15B and the thrust bearing 22B are mounted.

The cavity 14B of the joint body 14 opens on the right end thereof as shown in FIG. 1. The cavity 14B is defined by a substantial straight inner wall of the body 14 without stepped portions. A female screw 20 is provided on the inner wall near the right end of the joint body 14, in which a male screw 21 formed on the periphery of the fastening member 13 is screwed. The fastening member 13 is formed with a center hole 11 through which a pipe 12A is inserted into the cavity 14B.

Similarly, the pipe 12A is formed on its periphery with an annular groove 10A in which an inner ferrule 16A having a wedge-shaped section is mounted. This inner ferrule 16A is integral with a packing 17A disposed on the tip end of the pipe 12A.

Here, the inner ferrule 16A and the packing 17A have the same structure as the inner ferrule 16B and the packing 17B mentioned above. Thus, as shown in FIG. 4, the inner ferrule 16A is formed with a plurality of cut-out grooves 18A at predetermined intervals. The packing 17A is formed of an elastic body having a substantial V-shaped cross-section. This packing 17A is also provided with a plurality of protrusions 19A on the end plane thereof facing the inner ferrule 16A in correspondence with the grooves 18A.

The inner ferrule 16A and the packing 17A are slid onto the pipe 12A from its tip end by means of the jig 30 (see FIGS. 5 and 6). The inner ferrule 16A is widened through the grooves 18A until the inner ferrule 16A is fitted in the annular groove 10A of the pipe 12A. Thus, the inner ferrule 16A does not rotate with respect to the pipe 12A and can be moved along with the pipe 12A in an axial direction.

As shown in FIGS. 1 and 2, a gasket 25 is seated in a groove formed in the front end face of one of the packings, here packing 17B. The rear face and outside edge of the gasket 25 contacts the packing 17B. The rear surface of the gasket 25 as shown here also contacts the tip end of pipe 12B. Alternatively, the packing 17A can contain the groove for the gasket seat, as shown in FIG. 5.

An outer ferrule 15B is disposed on the right side of the inner ferrule 16A in the cavity 14B so that the inner ferrule 16A is wedged into the outer ferrule 15A. A thrust bearing 22A is disposed on the right side of the outer ferrule 15A, preventing the rotation of the pipe 12A even when the fastening member 13 rotates. The outer ferrule 15A is in contact with the left end plane of the fastening member 13 as shown in FIG. 1.

When the two pipes 12A and 12B on which the inner ferrules 16A and 16B are mounted respectively are made to contact under pressure each other, the packings 17A and 17B attached on the pipes 12A and 12B are compressed sealing the contact portion between the pipes 12A and 12B thereby to prevent the leakage of gas from the pipes 12A and 12B through the contact surfaces thereof.

At the same time, the front face of the gasket 25 contacts packing 17A and the tip end of pipe 12A to provide a second seal for preventing leakage of gas from the pipes 12A and 12B.

As shown in FIGS. 1 and 2, the purge port 3 is provided in the joint body 14 in a position corresponding to the contact portion of the pipes 12A and 12B, namely, a position corresponding to the clearance formed between the pipes 12A and 12B when separated. The purge port 3 communicates with a closed space defined in a cavity 14B by the packings 17A and 17B in contact with each other and the inner wall of the body 14, as shown in FIGS. 1 and 2.

Next, the process for connecting the pipes 12A and 12B by use of the weldless joint 1 constructed as above will be explained. To connect the pipes 12A and 12B from the separated state shown in FIG. 1, the pipes 12A and 12B are first made to come into contact with each other and then the fastening member 13 is screwed into the joint body 14.

As the fastening member 13 is screwed into the joint body 14, the outer ferrule 15A is pushed leftward, which presses the inner ferrule 16A wedged into the outer ferrule 15A in the same direction. The inner ferrule 16A pushes the pipe 12A through the annular groove 10A. As a result, the pipe 12A is made to contact the pipe 12B through the packings 17A and 17B, and further pressed. It is to be noted that the thrust bearing 22A allows the pipe 12A to move without rotating even when the fastening member 13 being screwed presses the outer ferrule 15A.

On the other hand, the pipe 12B presses the inner ferrule 16B leftward through the annular groove 10B. The pressing force of the inner ferrule 16B is exerted on the joint body 14. As described above regarding thrust bearing 22A, the thrust bearing 22B allows the pipe 12B to move without rotating even when the outer ferrule 15B presses the joint body 14.

Accordingly, screwing the fastening member 13 into the joint body 14 causes the packings 17A and 17B to be compressed thereby to seal the contact surfaces of the pipes 12A and 12B. At this time, the contact portion of the pipes 12A and 12B, namely, the position of the packings 17A and 17B is always at a predetermined position in the joint body 14 so as to correspond to the purge port 3.

On the other hand, loosening the fastening member 13 on the joint body 14 can causes the formation of the clearance between the pipes 12A and 12B in the position corresponding to the purge port 3. In this state with the clearance between the pipes 12A and 12B, the vacuum-evacuation and purge operations are repeated through the purge port 3 so that the process gas in the pipes 12A and 12B is replaced with inert gas.

Subsequently, the fastening member 13 is screwed again into the joint body 14 to connect the pipes 12A and 12B. The devices connected to the pipes 12A and 12B are replaced with new or different ones. Consequently, no air enters in the pipes 12A and 12B and hence the devices can be replaced without the inside thereof being exposed to air.

Figure 8:
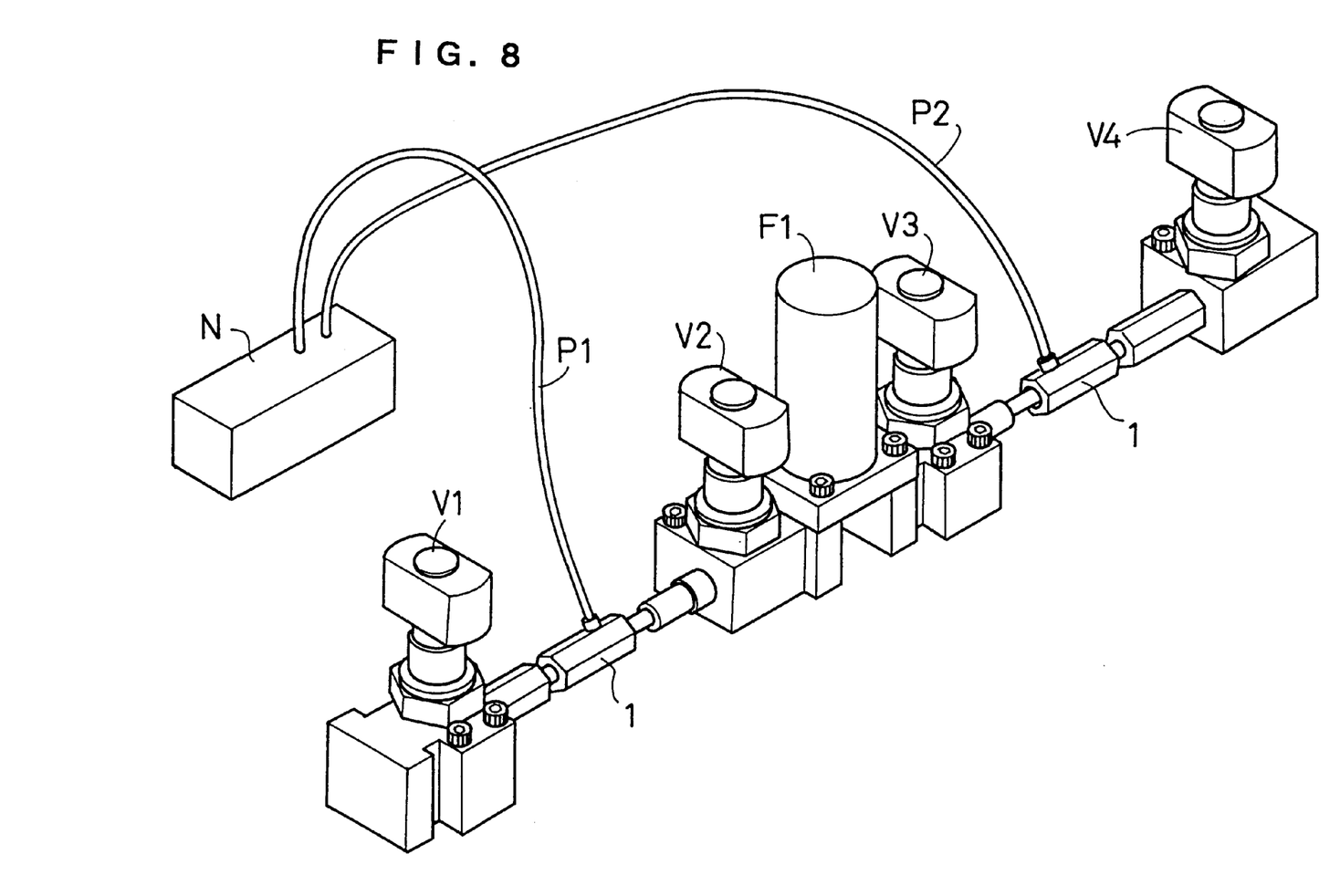
FIG. 8 is a perspective view of a part of a process gas pipe system in a semiconductor manufacturing line in which the weldless joint according to the invention is used to replace devices (purifier) of the system.

Explanation will be made concerning one example of the replacement of a purifier F1 which is a device connected to a process gas pipe system in the semiconductor manufacturing line, referring to FIG. 8. To replace the purifier F1 with new one, two pairs of valves (V1 and V2, and V3 and V4) are disposed on both sides of the purifier F1 as shown in FIG. 8. A weldless joint 1 constructed as above is arranged between a pair of valves V1 and V2 disposed on one side of the purifier F1. Similarly, another weldless joint 1 is arranged between another pair of valves V3 and V4. Purge ports 3 of the joints 1 are connected with tubes P1 and P2 respectively, which are connected to a purge controller N.

At first, in each of the weldless joint 1, the fastening member 13 is loosened of the joint body 14 to form the clearance between the pipes 12A and 12B (see FIG. 1). At this time, the inside of the process gas system connected with the purifier F1 is made to communicate with the purge controller N through the tubes P1 and P2 connected with the purge ports 3. The purge controller N is operated to repeat the vacuum-evacuation and the purge of inert gas so that the process gas in the process gas pipe system is sufficiently replaced with inert gas.

Then, the fastening member 13 is screwed in the joint body 14 so that the pipes 12a and 12B are made to contact under pressure each other (see FIG. 2). After the valves V1, V2, V3, and V4 are all closed, the purifiers F1 are replaced with new ones. During the replacement, although all of the valves V1–V4 are closed, entering of air into the process gas pipe system can not be completely prevented.

Therefore, the fastening member 13 in each joint 1 is loosened again on the joint body 14 to form the clearance between the pipes 12A and 12B shown in FIG. 1. The vacuum-evacuation and the purge of inert gas are repeated by the purge controller N so that the inside gas in the process gas pipe system in which the new purifiers F1 are disposed is sufficiently replaced with inert gas.

Finally, the fastening member 13 is screwed into the joint body 14 again to connect the pipes 12A and 12B as shown in FIG. 2. In this way, the purifier F1 which is a device connected in the process gas pipe system in the semiconductor manufacturing line can be replaced with new one so that the inside thereof is not exposed to air.

As described in detail above, the weldless joint 1 in the embodiment can allow the two pipes 12A and 12B to move in an axial direction without rotating in the cavity 14B of the joint body 14. If the fastening member 13 is screwed into the joint body 14, then the pipes 12A and 12B are moved closer to each other until they come into contact under pressure with each other. Accordingly, the two pipes 12A and 12B can be connected without being welded (see FIGS. 1 and 2).

The packings 17A and 17B mounted on the pipes 12A and 12B can prevent the leakage of gas through the contact surfaces of the pipes 12A and 12B and also the leakage of gas from the inside of the joint body 14 to the outside thereof. Accordingly, no packing or sealing element is provided on the periphery of the fastening member 13. This is because the gas leakage from the inside of the joint body 14 to the outside thereof would conventionally be caused between the joint body 14 and the fastening member 13 screwed in the body 14; however, the gas leakage is prevented by the packings 17A and 17B in the weldless joint 1 in the present embodiment, requiring no packing or sealing element on the fastening member 13.

Thus, no packing or sealing element exists between the joint body 14 and the fastening member 13, resulting in a reduction of the torque needed for screwing the fastening member 13.

Since there is no need to provide a packing or sealing element on the fastening member 13 as above, requiring no space for such the packing or sealing element, the weldless joint 1 can be reduced in size.

The packings 17A and 17B, which prevent the gas leakage through the contact surfaces of the pipes 12A and 12B and further the gas leakage from the inside of the joint body 14 to the outside thereof, are made integral with the inner ferrule 16A and 16B which are inner components in the joint body 14 as shown in FIG. 4. This makes it possible to facilitate the assembling and disassembling of the weldless joint 1 and to prevent the loss of the packings 17A and 17B.

Furthermore, the packings 17A and 17B are constructed integrally with the inner ferrules 16A and 16B (the inner members of the joint body 14) so as to be separable on disconnection of the pipes 12A and 12B. Furthermore the packings 17A and 17B can surely seal the joint portion between the pipes 12A and 12B when in contact.

The weldless joint 1 provided with the purge port 3 can be used as a purge joint as shown in FIG. 8. The use of the weldless joint 1 for connecting the pipes in the process gas pipe system can improve the workability in the replacement with inert gas or the replacement of the devices connected to the system.

Figure 7:
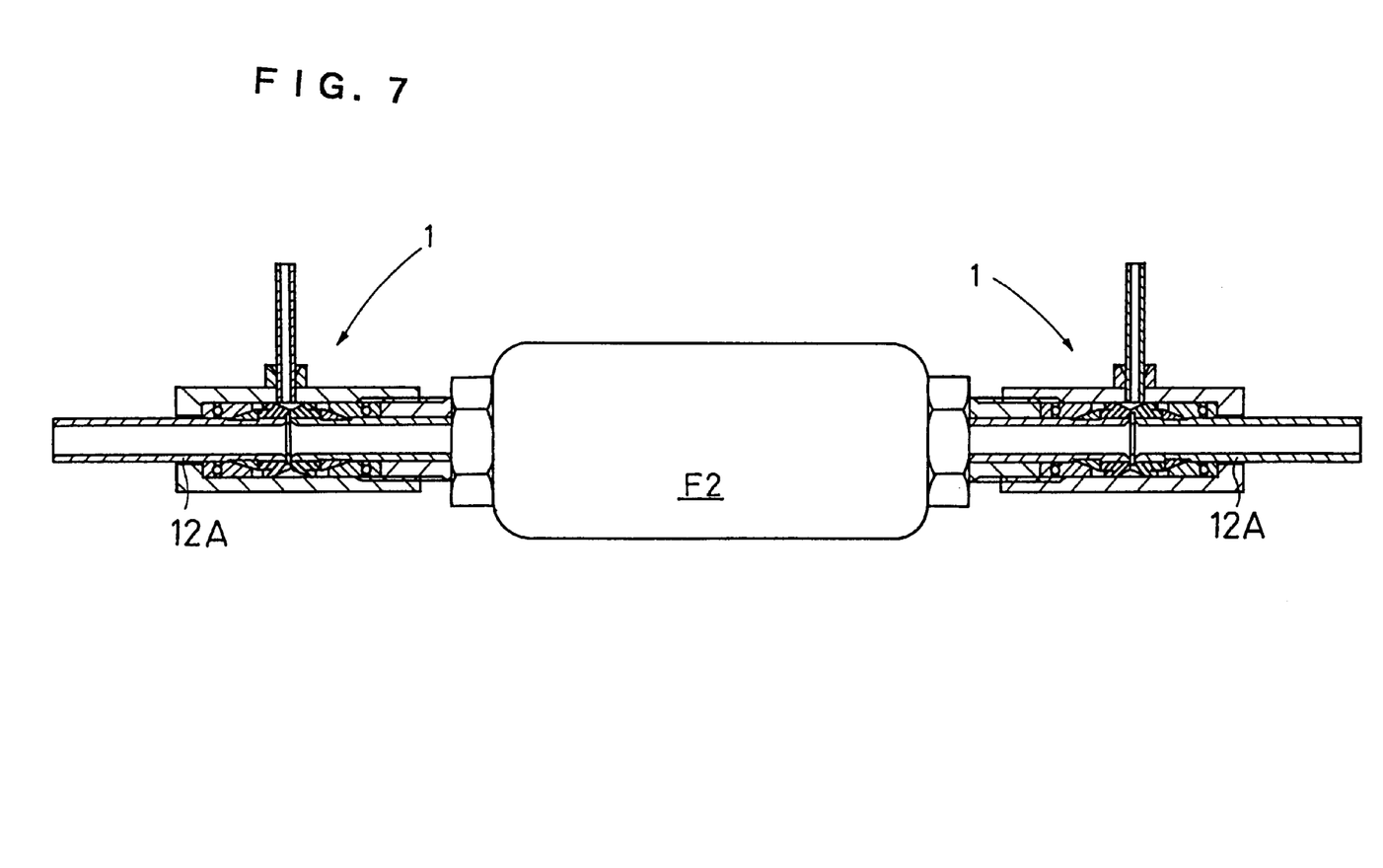
FIG. 7 is an example of the use of the weldless joint according to the invention.

The present invention may be embodied in other specific forms without departing from the spirit or essential characteristics thereof. For instance, as shown in FIG. 7, a connecting port of a device F2 in the process gas pipe system may be used as one of the two pipes to be connected by the weldless joint 1. In this case, the use of the weldless joint 1 can improve the workability in substituting inert gas and replacing various devices connected to the system.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A weldless joint including:
   two pipes to be connected at their respective ends by the weldless joint, the pipes capable of being moved during connection without rotation inside a joint body;
   a gasket having two sides that contact the ends of the two pipes for sealing the connection of the two pipes;
   a fastening member which is screwed into the joint body to connect the two pipes;
   two packings, each mounted on the end of a pipe, and contacting and compressing each other during connection of the pipes;
   the gasket and the two packings providing a double-seal to the ends of the two pines when the two pipes are connected; and
   the two packings being in contact with the joint body to prevent leakage of gas from inside of the joint body to the outside thereof when the fastening member is unscrewed sufficiently to provide a clearance between the ends of the two pipes.

2. A weldless joint according to claim 1, wherein each packing is provided integrally with an inner member disposed in the joint body.

3. A weldless joint according to claim 2, wherein the two packings move out of contact with each other when a clearance is provided between the ends of the pipes.

4. A weldless joint according to claim 2, wherein the inner member has a wedge-shaped section and the packing has a substantial V-shaped section in contact with the joint body to produce a closed space in the joint body in cooperation therewith.

5. A weldless joint according to claim 1, wherein the joint body is provided with a port and two holes used for insertion of the two pipes.

6. A weldless joint according to claim 5, wherein the port is a purge port.

7. A weldless joint according to claim 4, wherein the joint body is provided with a port and two holes used for insertion of the two pipes, the port communicating with the closed space in the joint body.

8. A weldless joint according to claim 7, wherein the port is a purge port.

9. A weldless joint according to claim 1, wherein the two pipes are used in a process gas pipe system.

10. A weldless joint according to claim 9, wherein one of the pipes is a connecting port of a device connected in the process gas pipe system.

* * * * *

UNITED STATES PATENT AND TRADEMARK OFFICE
CERTIFICATE OF CORRECTION

PATENT NO.: 6,062,605

DATED: May 16, 2000

INVENTOR(S): Kenichi GOSHIMA et al

It is certified that an error appears in the above-identified patent and that said Letters Patent is hereby corrected as shown below:

Title Page, item [57] (Abstract), line 4, "without welded" should read --without being welded--; delete "and".

Claim 1, col. 8, line 32, "pines" should read --pipes--.

Signed and Sealed this

Twentieth Day of March, 2001

Attest:

NICHOLAS P. GODICI

*Attesting Officer*  *Acting Director of the United States Patent and Trademark Office*